(12) United States Patent
Mathew et al.

(10) Patent No.: US 8,408,780 B2
(45) Date of Patent: Apr. 2, 2013

(54) PORTABLE COMPUTER HOUSING WITH INTEGRAL DISPLAY

(75) Inventors: Dinesh C. Mathew, Fremont, CA (US); Thomas W. Wilson, Jr., Saratoga, CA (US); Victor H. Yin, Cupertino, CA (US); Bryan W. Posner, La Selva Beach, CA (US); Chris Ligtenberg, San Carlos, CA (US); Brett W. Degner, Menlo Park, CA (US); Peteris K. Augenbergs, San Francisco, CA (US); Adam Garelli, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 577 days.

(21) Appl. No.: 12/691,714

(22) Filed: Jan. 21, 2010

(65) Prior Publication Data

US 2011/0103041 A1      May 5, 2011

Related U.S. Application Data

(60) Provisional application No. 61/257,807, filed on Nov. 3, 2009.

(51) Int. Cl.
F21V 7/04 (2006.01)
(52) U.S. Cl. .......................... 362/632; 362/633; 362/634
(58) Field of Classification Search ........... 362/632–634
See application file for complete search history.

(56) References Cited

U.S. PATENT DOCUMENTS

| | | | |
|---|---|---|---|
| 4,769,680 A | 9/1988 | Resor, III et al. | |
| 5,032,007 A | 7/1991 | Silverstein et al. | |
| 5,359,206 A | 10/1994 | Yamamoto et al. | |
| 5,481,430 A | 1/1996 | Miyagawa et al. | |
| 5,539,550 A | 7/1996 | Spitzer et al. | |
| 5,572,343 A | 11/1996 | Okamura et al. | |
| 5,623,392 A | 4/1997 | Ma | |
| 5,678,483 A | 10/1997 | Johnson | |
| 5,708,561 A | 1/1998 | Huilgol et al. | |

(Continued)

FOREIGN PATENT DOCUMENTS

| | | |
|---|---|---|
| JP | 06-245209 | 2/1994 |
| JP | 3387136 | 9/1994 |

(Continued)

OTHER PUBLICATIONS

Mathew et al., U.S. Appl. No. 13/249,174, filed Sep. 29, 2011.

(Continued)

*Primary Examiner* — William Carter
(74) *Attorney, Agent, or Firm* — Dorsey & Whitney LLP

(57) ABSTRACT

An electronic device such as a portable computer may have a housing with a rectangular recess in which layers of display structures such as a light guide panel layer and other light guide structures are directly mounted without intervening chassis members. Mating alignment features in the housing and display structures may be used to align the display structures relative to the housing. A display may be formed from glass layers such as a color filter glass layer and a thin-film transistor glass layer. Backlight for the display may be generated by an array of light-emitting diodes. The light guide panel may direct light from the light-emitting diodes through the glass layers. A clamp may be used to hold the light-emitting diodes and light guide structures in place in the recess. An undercut in the housing may also hold the light guide structures in place.

16 Claims, 16 Drawing Sheets

U.S. PATENT DOCUMENTS

| | | | |
|---|---|---|---|
| 5,739,800 A | 4/1998 | Lebby et al. | |
| 5,748,270 A | 5/1998 | Smith | |
| 5,760,858 A | 6/1998 | Hodson et al. | |
| 5,851,411 A | 12/1998 | An et al. | |
| 5,889,568 A | 3/1999 | Scraphim et al. | |
| 5,940,153 A | 8/1999 | Castaneda et al. | |
| 5,965,916 A | 10/1999 | Chen | |
| 5,988,827 A | 11/1999 | Lee | |
| 5,990,986 A | 11/1999 | Song et al. | |
| 6,104,461 A | 8/2000 | Zhang et al. | |
| 6,278,504 B1 | 8/2001 | Sung | |
| 6,335,773 B1 | 1/2002 | Kamei et al. | |
| 6,483,719 B1 | 11/2002 | Bachman | |
| 6,525,786 B1 | 2/2003 | Ono | |
| 6,532,152 B1 | 3/2003 | White | |
| 6,570,757 B2 | 5/2003 | DiFonzo et al. | |
| 6,919,678 B2 | 7/2005 | Ozolins et al. | |
| 6,940,564 B2 | 9/2005 | Murden et al. | |
| 7,013,558 B2 | 3/2006 | Bachman | |
| 7,035,090 B2 | 4/2006 | Tanaka et al. | |
| 7,133,104 B2 | 11/2006 | Kim et al. | |
| 7,161,185 B2 | 1/2007 | Yamazaki et al. | |
| 7,217,588 B2 | 5/2007 | Hartzell et al. | |
| 7,237,941 B2 * | 7/2007 | Hsieh et al. | 362/633 |
| 7,245,333 B2 | 7/2007 | Nam et al. | |
| 7,425,749 B2 | 9/2008 | Hartzell et al. | |
| 7,489,291 B2 | 2/2009 | Yamazaki et al. | |
| 7,522,236 B2 | 4/2009 | Gettemy et al. | |
| 7,551,358 B2 | 6/2009 | Lee et al. | |
| 7,569,410 B2 | 8/2009 | Hartzell et al. | |
| 7,582,904 B2 | 9/2009 | Fujii et al. | |
| 7,585,121 B2 | 9/2009 | Tsai | |
| 7,629,613 B2 | 12/2009 | Sohn et al. | |
| 7,663,607 B2 | 2/2010 | Hotelling et al. | |
| 7,728,906 B2 | 6/2010 | Bilbrey | |
| 7,728,937 B2 | 6/2010 | Kume et al. | |
| 7,790,487 B2 | 9/2010 | Shih et al. | |
| 7,812,920 B2 | 10/2010 | Lino | |
| 7,813,042 B2 | 10/2010 | Mather et al. | |
| 7,821,561 B2 | 10/2010 | Tsuboi | |
| 7,830,370 B2 | 11/2010 | Yamazaki et al. | |
| 7,852,440 B2 | 12/2010 | Kunimori et al. | |
| 7,859,606 B2 | 12/2010 | Higaki et al. | |
| 7,894,021 B2 | 2/2011 | Yang et al. | |
| 7,933,123 B2 | 4/2011 | Wang et al. | |
| 7,936,346 B2 | 5/2011 | Kunimori et al. | |
| 8,049,221 B2 | 11/2011 | Komori | |
| 2001/0000676 A1 | 5/2001 | Zhang et al. | |
| 2001/0019130 A1 | 9/2001 | Yamazaki et al. | |
| 2002/0051112 A1 | 5/2002 | Katsura | |
| 2002/0063253 A1 | 5/2002 | Hong et al. | |
| 2003/0133070 A1 | 7/2003 | Nam et al. | |
| 2003/0161093 A1 | 8/2003 | Lam et al. | |
| 2004/0212555 A1 | 10/2004 | Falco | |
| 2004/0263670 A1 | 12/2004 | Yaasaki | |
| 2005/0018121 A1 | 1/2005 | Jen et al. | |
| 2005/0041166 A1 | 2/2005 | Yamazaki et al. | |
| 2005/0078252 A1 | 4/2005 | Lin | |
| 2005/0195621 A1 | 9/2005 | Chang et al. | |
| 2005/0214984 A1 | 9/2005 | Maruyama et al. | |
| 2005/0285996 A1 | 12/2005 | Nakamura et al. | |
| 2006/0001802 A1 | 1/2006 | Kao | |
| 2006/0012969 A1 | 1/2006 | Bachman | |
| 2006/0033874 A1 | 2/2006 | Sakama et al. | |
| 2006/0113894 A1 | 6/2006 | Fujii et al. | |
| 2006/0125982 A1 | 6/2006 | Lin et al. | |
| 2006/0138296 A1 | 6/2006 | DeLuga | |
| 2006/0148425 A1 | 7/2006 | Carlson | |
| 2006/0176417 A1 | 8/2006 | Wu et al. | |
| 2006/0227232 A1 | 10/2006 | Zhang et al. | |
| 2006/0279652 A1 | 12/2006 | Yang | |
| 2007/0109461 A1 | 5/2007 | Park | |
| 2007/0126966 A1 | 6/2007 | Takahashi | |
| 2007/0189730 A1 | 8/2007 | Okamura | |
| 2007/0291172 A1 | 12/2007 | Kouzimoto et al. | |
| 2008/0036942 A1 | 2/2008 | Hsieh | |
| 2008/0049004 A1 | 2/2008 | Kunimori et al. | |
| 2008/0057604 A1 | 3/2008 | Tanaka | |
| 2008/0079860 A1 | 4/2008 | Kunimori et al. | |
| 2008/0239754 A1 * | 10/2008 | Kang et al. | 362/617 |
| 2008/0261057 A1 | 10/2008 | Slobodin | |
| 2008/0291356 A1 | 11/2008 | Kim | |
| 2009/0085848 A1 | 4/2009 | Huang et al. | |
| 2009/0091673 A1 | 4/2009 | Chen et al. | |
| 2009/0153762 A1 | 6/2009 | Kuwabara et al. | |
| 2009/0212300 A1 | 8/2009 | Komori | |
| 2009/0237602 A1 | 9/2009 | Kubota et al. | |
| 2009/0237957 A1 * | 9/2009 | Tsubaki | 362/615 |
| 2009/0262277 A1 | 10/2009 | Kim | |
| 2009/0273550 A1 | 11/2009 | Vieri et al. | |
| 2009/0279284 A1 * | 11/2009 | Takeuchi et al. | 362/97.3 |
| 2009/0280606 A1 | 11/2009 | Shih et al. | |
| 2010/0001973 A1 | 1/2010 | Hotelling et al. | |
| 2010/0020277 A1 | 1/2010 | Morita | |
| 2010/0026656 A1 | 2/2010 | Hotelling et al. | |
| 2010/0039530 A1 | 2/2010 | Guo et al. | |
| 2010/0079942 A1 * | 4/2010 | Yamamoto et al. | 361/690 |
| 2010/0097525 A1 | 4/2010 | Mino | |
| 2010/0144391 A1 | 6/2010 | Chang et al. | |
| 2010/0167443 A1 | 7/2010 | Okada et al. | |
| 2010/0182273 A1 | 7/2010 | Noguchi et al. | |
| 2010/0182538 A1 | 7/2010 | Takata | |
| 2010/0207857 A1 | 8/2010 | Gu et al. | |
| 2010/0225844 A1 * | 9/2010 | Kamada | 362/433 |
| 2010/0273530 A1 | 10/2010 | Jarvis et al. | |
| 2010/0302478 A1 | 12/2010 | Nakagawa et al. | |
| 2010/0309102 A1 | 12/2010 | Jung | |
| 2010/0315570 A1 | 12/2010 | Mathew et al. | |
| 2010/0315769 A1 | 12/2010 | Mathew et al. | |
| 2010/0315868 A1 | 12/2010 | Tokunaga et al. | |
| 2010/0321325 A1 | 12/2010 | Springer et al. | |
| 2011/0001706 A1 | 1/2011 | Sanford et al. | |
| 2011/0005662 A1 | 1/2011 | Sung | |
| 2011/0051411 A1 | 3/2011 | Kim et al. | |
| 2011/0063550 A1 | 3/2011 | Gettemy et al. | |
| 2011/0090444 A1 | 4/2011 | Kimura | |
| 2011/0103041 A1 | 5/2011 | Mathew et al. | |
| 2011/0109829 A1 | 5/2011 | Mathew et al. | |
| 2011/0149139 A1 | 6/2011 | Chang | |
| 2011/0244656 A1 | 10/2011 | Dairiki et al. | |

FOREIGN PATENT DOCUMENTS

| | | |
|---|---|---|
| JP | 6245209 | 9/1994 |
| JP | 2000330090 | 11/2000 |
| JP | 2001117077 | 4/2001 |
| JP | 2004-135275 | 4/2004 |
| JP | 2005-176151 | 6/2005 |
| JP | 2009051272 | 1/2009 |
| KR | 100400714 | 9/2003 |
| KR | 2004017693 | 2/2004 |
| KR | 100809277 | 2/2008 |
| KR | 1020080058911 | 6/2008 |
| KR | 100856092 | 9/2008 |
| KR | 1020080089908 | 10/2008 |
| WO | 2008/120879 | 10/2008 |

OTHER PUBLICATIONS

Mathew et al., U.S. Appl. No. 13/249,653, filed Sep. 30, 2011.
Mathew et al., U.S. Appl. No. 13/246,828, filed Sep. 30, 2011.
Mathew et al., U.S. Appl. No. 12/916,474, filed Oct. 29, 2010.
Mathew et al., U.S. Appl. No. 12/916,475, filed Oct. 29, 2010.
"LCD With Embedded Camera for Picture Telephone," IBM Corporation Research Disclosure 42572 Sep. 1999.
Sanford et al., U.S. Appl. No. 12/835,695, filed Jul. 13, 2010.
Sanford et al., U.S. Appl. No. 12/870,769, filed Aug. 27, 2010.
Garelli et al., U.S. Appl. No. 12/862,748, filed Aug. 24, 2010.
Wang et al., U.S. Appl. No. 12/119,986, filed May 13, 2008.
Mathew et al., U.S. Appl. No. 12/483,205, filed Jun. 11, 2009.
Mathew et al., U.S. Appl. No. 12/483,206, filed Jun. 11, 2009.

* cited by examiner

PORTABLE COMPUTER HOUSING WITH INTEGRAL DISPLAY

This application claims the benefit of provisional patent application No. 61/257,807, filed Nov. 3, 2009, which is hereby incorporated by reference herein in its entirety.

BACKGROUND

This invention relates to electronic devices and, more particularly, to display structures for electronic devices such as portable computers.

Portable computers typically have upper and lower housing portions that are connected by a hinge. The lower housing portion contains components such as printed circuit boards, disk drives, a keyboard, and a battery. The upper housing portion contains a display. When the computer is in an open configuration, the upper housing portion is vertical and the display is visible to the user of the portable computer. When the computer is closed, the upper housing lies flat against the lower housing. This protects the display and keyboard and allows the portable computer to be transported.

Portable computer displays typically contain fragile structures such as layers of glass. Displays can therefore be challenging to mount properly within the upper housing. If care is not taken, the display and the surrounding portions of the upper housing will be bulky and unsightly. At the same time, the elimination of certain structures in the display may result in display that is overly fragile. This could lead to damage to the display during normal use.

It would therefore be desirable to be able to provide improved display structures in electronic devices such as portable computers.

SUMMARY

An electronic device such as a portable computer may have a housing. The housing may have upper and lower portions that are connected by a hinge. Display structures for a display may be mounted in a portion of the housing such as the upper housing portion.

The display structures may include a color filter glass layer and a thin-film transistor substrate layer. Light-guide structures may be mounted under the thin-film transistor substrate layer. The light guide structures may include a reflective sheet of material such as white polyester (e.g., Mylar®), a layer of light guide material (sometimes referred to as a light guide panel or LGP), and one or more layers of optical film (e.g., diffuser layers, light collimating layers, etc.). The light guide structures may be mounted directly in a rectangular recess in the interior of the housing without using chassis structures. For example, the light guide structures may be provided with tabs that mate directly with corresponding features in the housing.

Undercut structures may be formed in the housing to accommodate the display structures. For example, the undercut structures may receive some or all of the light guide structures.

An array of light-emitting diodes may provide backlight for the display structures. The light-emitting diodes may emit light into an edge of the light guide panel. A reflective sheet on the rear of the light guide panel may be used to reflect light outwards through the display structures. The edges of the reflective sheet may be wrapped around the edges of the light guide panel to reflect light that would otherwise leak out of the edges of the panel. Light may also be reflected by coating interior housing surfaces with a reflective coating.

Clamp structures may be used to hold the light-emitting diode array and light-guide panel in place.

Reflective tape and reflective sheets of material may be used to help guide light from the light-emitting diode array into the edge of the light guide panel. Reflective tape may be placed on the lower surface of a clamp member.

A cosmetic bezel may be used to cover edges of the display structures. For example, in display structure configurations in which a driver integrated circuit might be visible from the exterior of the device, a bezel may be used to hide the integrated circuit from view.

Further features of the invention, its nature and various advantages will be more apparent from the accompanying drawings and the following detailed description of the preferred embodiments.

DETAILED DESCRIPTION

Figure 1:
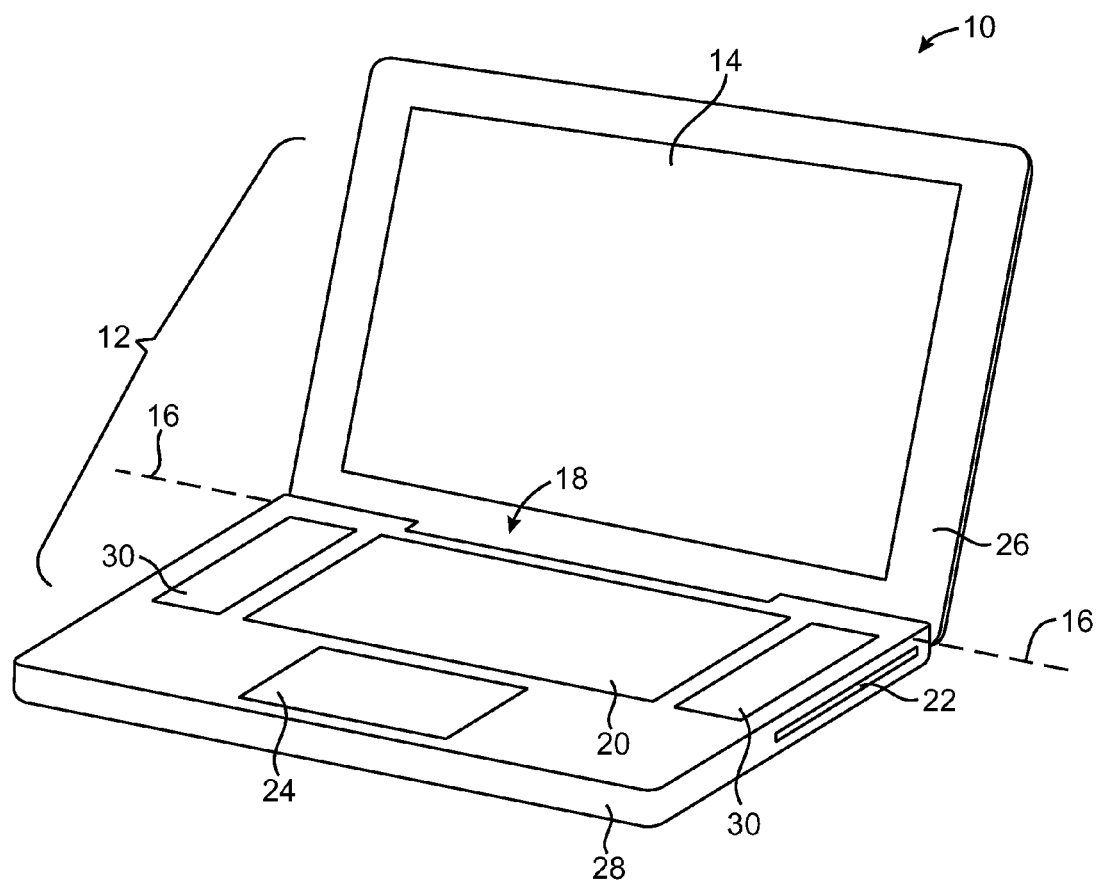
FIG. 1 is a perspective view of an illustrative portable computer with display structures in accordance with an embodiment of the present invention.

An illustrative electronic device such as a portable computer in which display structures may be provided is shown in FIG. 1. As shown in FIG. 1, portable computer 10 may have housing 12. Housing 12, which is sometimes referred to as a case, may be formed from one or more individual structures. For example, housing 12 may have a main structural support member that is formed from a solid block of machined aluminum or other suitable metal. One or more additional structures may be connected to the housing 12. These structures may include, for example, internal frame members, external coverings such as sheets of metal, etc. Housing 12 and its associated components may, in general, be formed from any suitable materials such as such as plastic, ceramics, metal, glass, composites, etc. An advantage of forming housing 12 at least partly from metal is that metal is durable and attractive in appearance. Metals such as aluminum may be anodized to form an insulating oxide coating.

In general, the components of portable computer 10 can be formed from any suitable materials. As examples, the components of portable computer 10 may be formed from materials such as metals (e.g., aluminum, stainless steel, alloys of metals, electroplated metals, plated and other coated metals, etc.), plastics (e.g., polycarbonate (PC) plastics, acrylonitrile butadiene styrene (ABS) plastics, thermoplastics, PC/ABS plastic blends, etc.), composite materials (e.g., carbon fibers or other fibers bound by a binder such as a polymer resin), plastics that have been injection molded around metal structures, laminated plastic layers, ceramics, metal, glass, composites, metal-filled epoxy, other suitable materials, and combinations of these and other materials. Components of portable computer 10 which are described herein as being formed from one or more specific materials (e.g., housing 12 which is sometimes described herein as being formed from machined aluminum as an example) can be formed from any of the above-mentioned materials, other suitable materials, or combinations of such materials.

Housing 12 may have an upper portion 26 and a lower portion 28. Lower portion 28 may be referred to as the base or main unit of computer 10 and may contain components such as a hard disk drive, battery, and main logic board. Upper portion 26, which is sometimes referred to as a cover, lid, or display housing, may rotate relative to lower portion 28 about rotational axis 16. Portion 18 of computer 10 may contain a hinge and associated clutch structures and is sometimes referred to as a clutch barrel.

Lower housing portion 28 may have a slot such as slot 22 through which optical disks may be loaded into an optical disk drive. Lower housing portion may also have a touchpad such as touchpad 24 and may have keys 20. If desired, additional components may be mounted to upper and lower housing portions 26 and 28. For example, upper and lower housing portions 26 and 28 may have ports to which cables can be connected (e.g., universal serial bus ports, an Ethernet port, a Firewire port, audio jacks, card slots, etc.). Buttons and other controls may also be mounted to housing 12. Speaker openings such as speaker openings 30 may be formed in lower housing portion 28 by creating an array of small openings (perforations) in the surface of housing 12.

A display such as display 14 may be mounted within upper housing portion 26. Display 14 may be, for example, a liquid crystal display (LCD), organic light emitting diode (OLED) display, or plasma display (as examples). Display 14 may contain a number of layers of material. These display structures may include, for example, layers of optically transparent materials such as plastic and glass. Layers of plastic and optical adhesive may also be incorporated into display 14. In a liquid crystal display, layers of polarizer, light diffusing elements and light guides for backlight structures, a liquid crystal layer, and a thin-film transistor array that drives the image pixels in the display may be incorporated into the display.

Computer 10 may have input-output components such as touch pad 24. Touch pad 24 may include a touch sensitive surface that allows a user of computer 10 to control computer 10 using touch-based commands (gestures). A portion of touchpad 24 may be depressed by the user when the user desires to "click" on a displayed item on screen 14.

Figure 2:
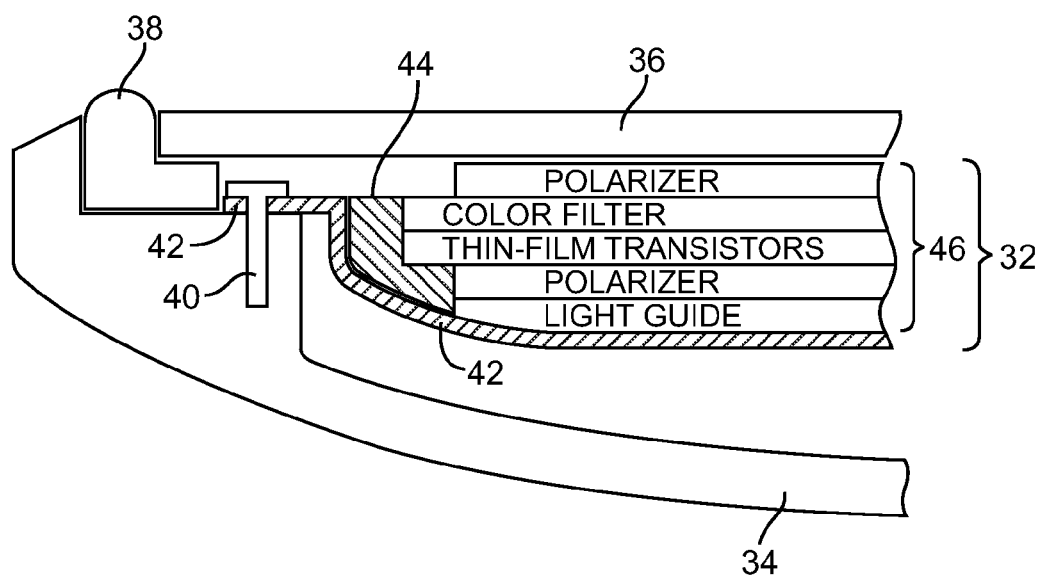
FIG. 2 is a cross-sectional side view of a conventional liquid crystal display (LCD) module in a portable computer display housing.

A cross-sectional side view of a conventional liquid crystal display (LCD) display module mounted in a computer housing is shown in FIG. 2. As shown in FIG. 2, display module 32 may have display structures 46 such as an upper polarizer layer, a color filter, a thin-film transistor glass layer, a lower polarizer, and a layer of light-guide structures. The light guide structures may include a reflective bottom sheet, a light guide panel that guides light from an array of edge-mounted light-emitting diodes over the full surface area of the display, and layers of optical films such as diffuser layers. Display module 32 may also have a plastic chassis member such as plastic chassis member 44 and a metal chassis member such as metal chassis member 42 into which the layers of glass and other display module structures may be mounted. Cover glass 36 may be placed on top of structures 46.

Metal chassis member 42 may have a tab with a hole through which screw 40 passes. Screw 40 may be screwed into a threaded hole in housing 34. In the arrangement of FIG. 2, housing 34 is formed of aluminum. The presence of the extending tab portion of chassis 42 allows module 32 to be firmly secured in housing 34, but adds undesirable width to the perimeter of display module 32.

Elastomeric gasket 38 is used to form a cushioned interface between cover glass layer 36 and housing 34. This helps to prevent damage to cover glass layer 36. Cover glass 36 is formed from clear glass and helps to protect layers 46 of LCD module 32 from damage, but adds undesirable thickness.

Figure 3:
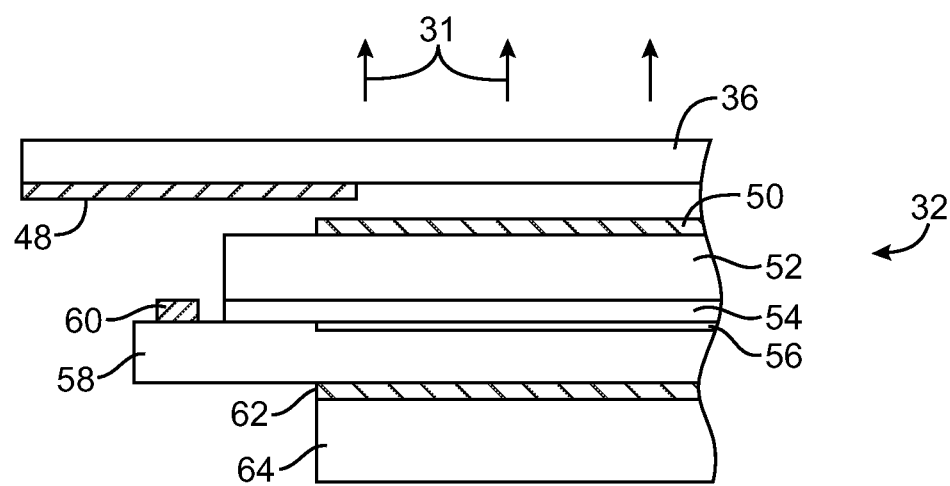
FIG. 3 is a cross-sectional side view of an edge portion of a conventional LCD module.

Another cross-sectional view of a conventional liquid crystal display module is shown in FIG. 3. As shown in FIG. 3, display module 32 may have polarizers such as upper polarizer layer 50 and lower polarizer 62. Light guide structure 64 may provide backlight for module 32. The light from structure 64 passes through the display pixels of module 32 and exits display module 32 in direction 31.

Color filter glass layer 52, liquid crystal layer 54, and thin-film transistor (TFT) glass layer 58 are interposed between polarizer layers 50 and 62.

The polarization of individual pixels of liquid crystal material in liquid crystal layer 54 interacts with the polarizing effects of layers 50 and 62 to determine which display pixels block light and which pixels allow light to pass. Color filter glass layer 52 contains an array of colored filters that provide display 32 with the ability to represent different colors. The polarization of liquid crystal material in liquid crystal layer 54 is controlled electrically by thin-film transistor array 56. Thin-film transistors in array 56 are formed on the upper surface of thin-film transistor (TFT) glass layer 58.

Thin-film transistors 56 are controlled by drivers contained in driver circuit 60. Color filter layer 52 is horizontally (laterally) recessed with respect to TFT layer 58 to form a ledge on which driver circuit 60 is mounted. In a typical display module, there may be a number of driver chips such as circuit 60 that are mounted around the periphery of the display. Conductive traces on the upper surface of TFT layer 58 interconnect driver circuit 60 with thin-film transistors 56.

In conventional arrangements of the type shown in FIG. 3, black ink 48 is placed on the underside of cover glass 36 around the periphery of the display. This creates an opaque region that blocks inactive peripheral portions of display module 32 from view. Black ink 48 can also hide mounting structures such as screw 40 of FIG. 2 from view. Display glass 36 may help provide structural support to the display housing of the portable computer in which display module 32 is mounted, but the presence of glass 36 can add a non-negligible amount of extra thickness and weight to a display.

Figure 4:
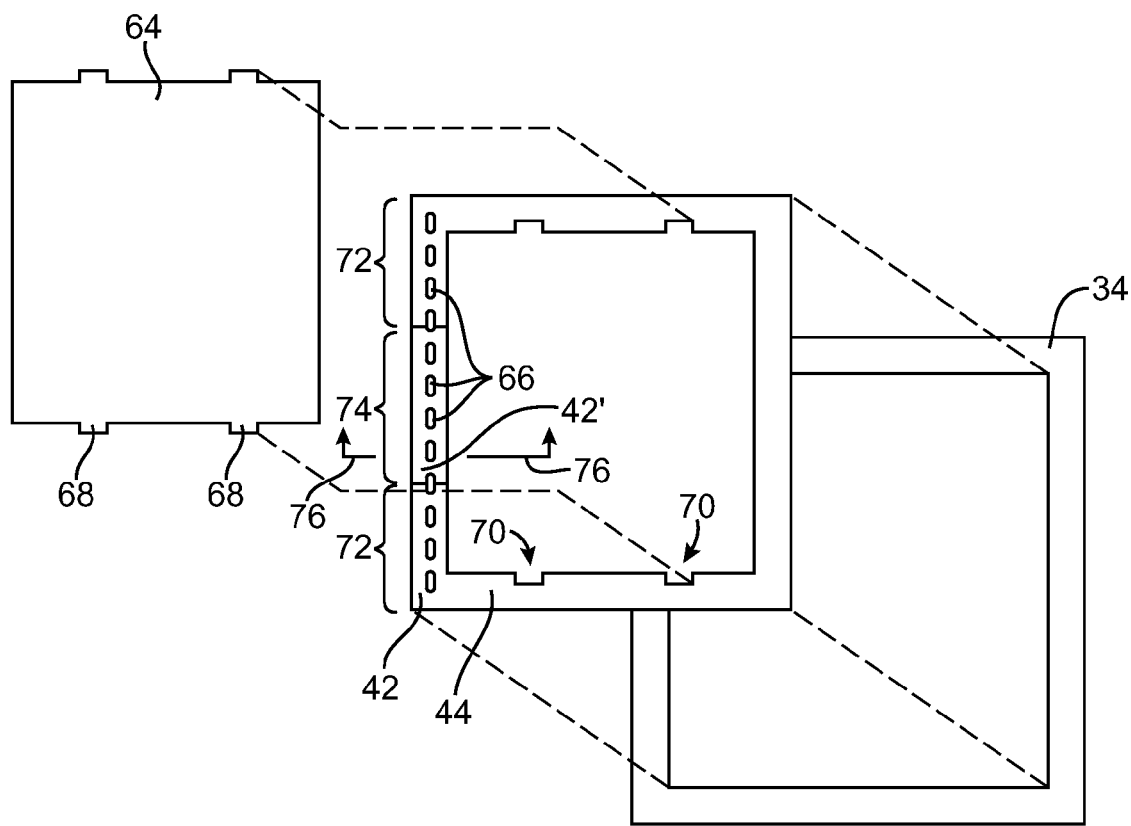
FIG. 4 is an exploded view of a conventional computer housing and conventional display structures.

An exploded view of a conventional display and computer housing is shown in FIG. 4. As shown in FIG. 4, light guide structures 64 may have tabs 68 that mate with recesses in plastic chassis 44. Light-emitting diode array 66 is covered with plastic chassis parts in regions 72. In region 74, part of metal chassis 42 (shown as metal chassis portion 42') is bent up and over the light-emitting diode array to hold the array in place. Chassis 42 and chassis 44 may be mounted in housing 34.

Figure 5:
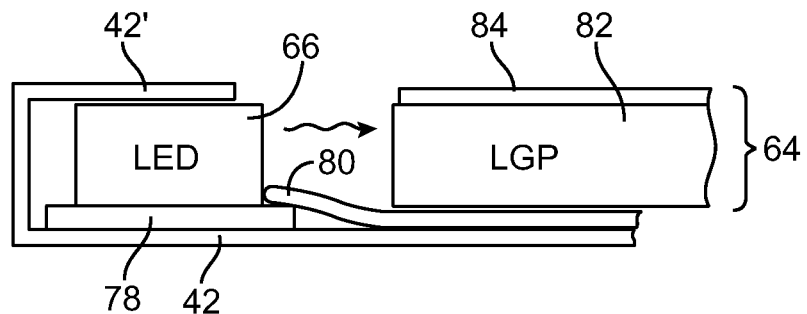
FIG. 5 is a cross-sectional side view of a conventional light-emitting-diode array in a conventional display module.

A cross-sectional side view of the conventional structures of FIG. 4 taken along line 76-76 of FIG. 4 is shown in FIG. 5. As shown in FIG. 5, light guide structures 64 include reflective polyester sheet 80 (e.g., white polyester), light-guide panel 82, and optical films 84. Metal chassis portion 42' covers light-emitting diode array 66. Light-emitting diode array 66 contains light-emitting diodes that provide backlight for the display. The light-emitting diode chips are mounted on flexible printed circuit ("flex circuit") 78. The edge of reflective sheet 80 covers the edge of flex circuit 78.

Figure 6:
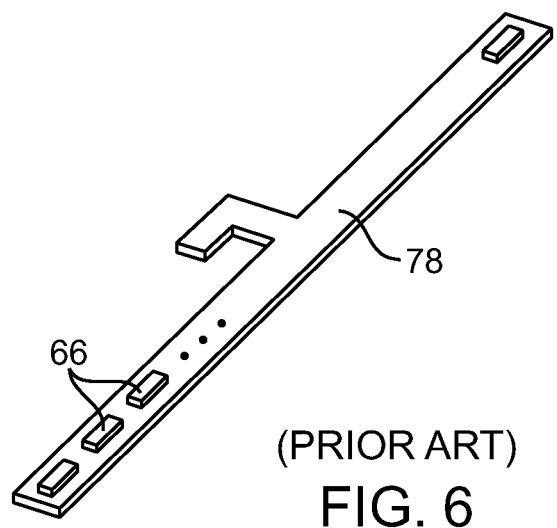
FIG. 6 is a perspective view of conventional light-emitting-diodes mounted on a flex circuit.

FIG. 6 shows a perspective view of a conventional light-emitting diode array containing light-emitting diodes 66 and flex circuit substrate 78.

Figure 7:
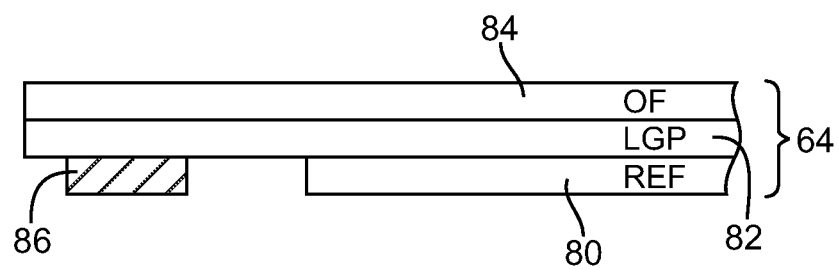
FIG. 7 is a cross-sectional side view of conventional backlight component in a conventional computer housing.

Conventional light guide structures 64 may be provided with a peripheral strip of double-sided tape, as shown by tape 86 in FIG. 7.

Figure 8:
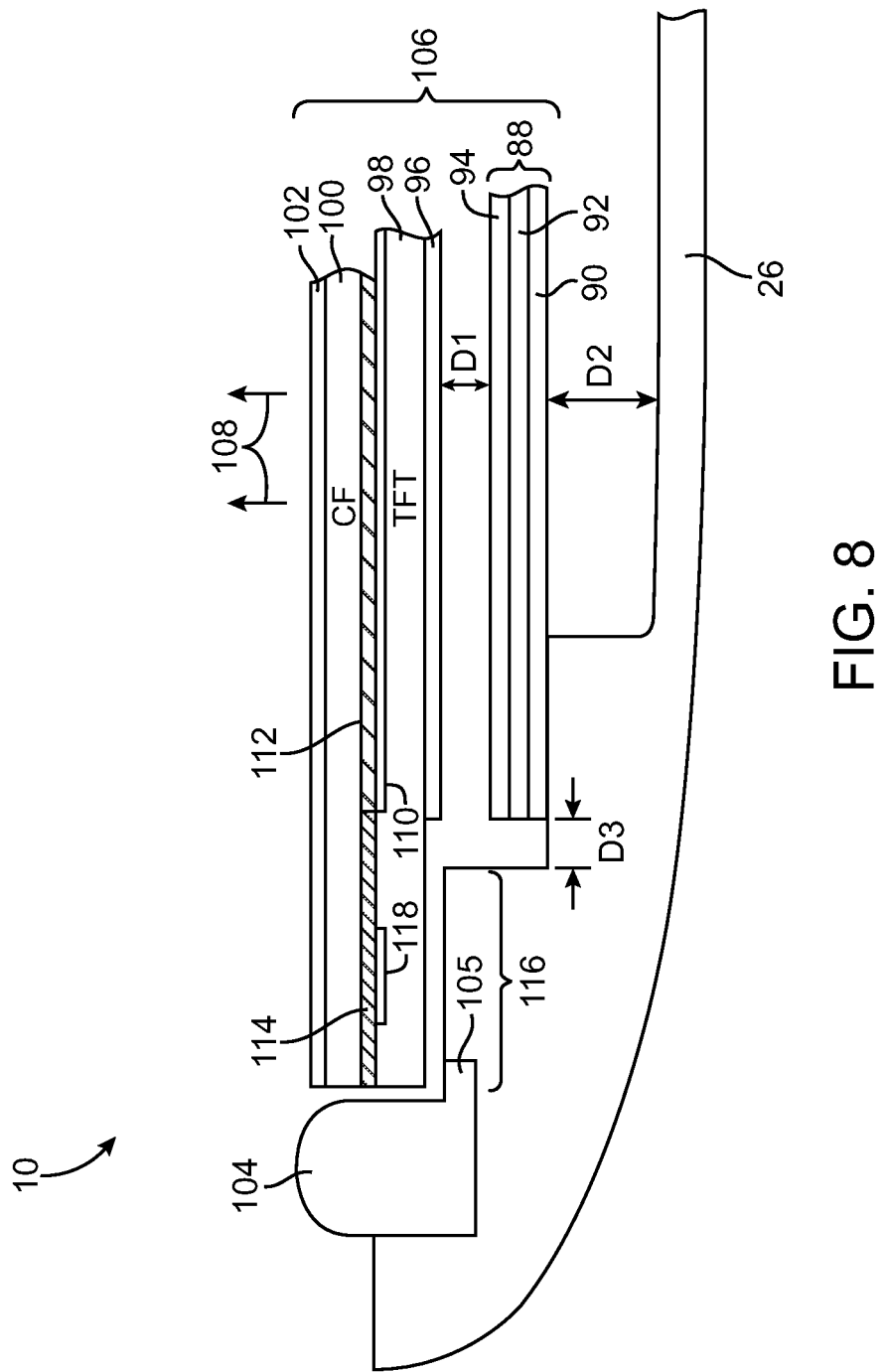
FIG. 8 is a cross-sectional side view of illustrative display structures in an electronic device such as a portable computer in accordance with an embodiment of the present invention.

FIG. 8 shows a cross-sectional side view of a portion of upper housing 26 of device 10 (FIG. 1) in which display structures 106 have been mounted. Upper housing 26 may, for example, be formed from machined aluminum. Elastomeric gasket 104 may be used to provide a soft interface between potentially fragile glass layers in structures 106 and housing 26.

Display structures 106 may produce an image using any suitable display technology (e.g., light-emitting diodes such as an array of organic light-emitting diodes, liquid crystal display pixels, plasma-based pixels, etc.). In general, display structures 106 may be formed from any suitable materials (e.g., plastic, glass, other optically suitable materials, etc.). An arrangement in which display structures 106 are based on liquid crystal display (LCD) technology is sometimes described herein as an example. The use of LCD structures in display structures 106 is, however, merely illustrative. Display structures 106 may, in general, be formed from any suitable type of display structures.

As shown in FIG. 8, display structures 106 may have an upper polarizer layer 102 and a lower polarizer layer 96. Light guide structures 88 may provide backlight for structures 106. Light-guide structures 88 may include reflective structures such as reflective sheet 90 (e.g., white polyester), light-guide panel 92, and optical films 94. Optical films 94 may include a diffuser layer and light collimating layers (as an example). If desired, light reflection functions may be provided by housing 26. Housing 26 may be formed from a reflective material such as metal and/or the interior surfaces of housing 26 may be coated with a reflective coating such white paint or ink, silver paint or ink, a reflective material such as chromium, etc. In arrangements in which housing 26 is highly reflective, some or all of reflective sheet 90 may be omitted.

Clearances D2 and D1 help prevent damage to display structure 106 during use of device 110. In a typical arrangement, clearance D2 may be about 1.2 to 1.8 mm and clearance D1 may be about 0.11 mm. End clearance D3 may be about 0.3 mm.

Light from a light-emitting diode array or other backlight source is provided to an edge of light guide panel 92. Panel 92 and the other structures in light guide structures 88 direct this light upwards in direction 108 through thin film transistor layer 98 and color filter layer 100.

Thin-film transistor substrate glass layer 98 may contain thin-film transistors in array 110. Color filter glass layer 100 may contain an array of optical filters of different colors to provide display structures 106 with the ability to display color images. Color filter layer 100 may be formed from glass into which dye of different colors has been impregnated, from a glass layer coated with a pattern of colored dye, from a glass or plastic layer that is covered with a pattern of thin colored filter structures (e.g., filters formed from polymer or glass containing dye), or any other suitable color filter structures. Liquid crystal layer 112 may be controlled by the electric fields produced by the thin-film transistors of array 110.

As shown in FIG. 8, the layer of cover glass that is present in conventional display modules need not be present in display structures 106 and device 10. Rather, color filter layer 100 may serve as the uppermost glass layer in structures 106 and device 10. To ensure that structures 106 are sufficiently robust, color filter layer 100 may be thickened or may be stiffened using support structures within display structures 106. Color filter layer 100 may be formed of a durable clear layer (e.g., a strong glass or plastic) that resists damage from contact. Anti-scratch coatings may also be provided on the surface of color filter layer 100 (e.g., as part of polarizer layer 102 or above polarizer layer 102).

To hide the peripheral portions of display structures 106 that lie along the outer edges of display housing 26 from view, an opaque material such as ink layer 114 may be incorporated around the periphery of display structures 106 to form a border. Opaque layer 114 may be formed on the underside of color filter layer 100 or on the upper surface of thin-film transistor glass layer 98 (as examples). The opaque material may have any suitable color (e.g., black, grey, silver, white, blue, red, etc.).

With the arrangement of FIG. 8, color filter layer 100 and thin-film transistor layer 98 extend outwardly (in the leftward direction in the orientation of FIG. 8) so as to form an overhanging portion 116 that is supported by the matching ledge in housing 26. If desired, only color filter layer 100 may extend in this way (e.g., so that the overhanging portion of layer 100 rests on the ledge formed by housing 26). In this type of arrangement, the thin-film transistor layer may extend only as far as light-guide structures 88 of FIG. 8. If desired, portions of gasket 104 may be interposed between display structures 106 and housing 26 in region 116, as illustrated by protruding lower lip portion 105 of gasket 104 in the example of FIG. 8. Display driver circuitry 118 may, if desired, be formed in region 116 (e.g., as part of thin film transistor layer 98 or in a chip mounted on thin film transistor layer or color filter layer 100).

Figure 9:
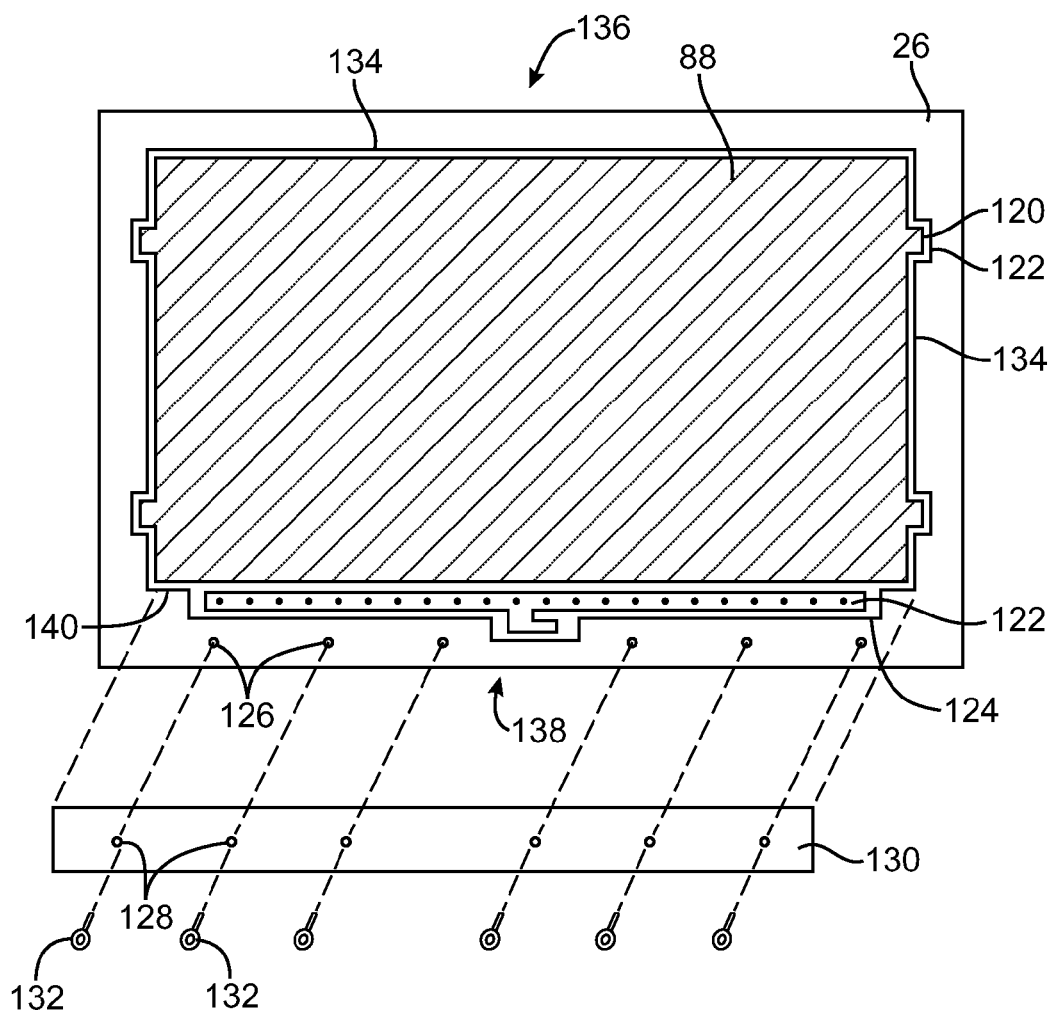
FIG. 9 is an exploded view showing how display components may be mounted directly in a recess in a computer housing in accordance with an embodiment of the present invention.

To ensure that light guide structures 88 are properly aligned within housing 26 even in the absence of conventional structures such as plastic chassis 44 and metal chassis 42 (FIG. 2), housing 26 may be provided with alignment features such as rectangular recesses 122 of FIG. 9 that mate with corresponding alignment features on light guide structures 88 such as protruding tabs 120 of FIG. 9. When housing 26 is formed by a molding process (e.g., plastic injection molding), alignment features can be molded into housing 26 as part of the housing fabrication process. When housing 26 is formed by a machining process (e.g., a process in which an aluminum block or other block of material is machined using a computer-controlled machining tool), alignment features can be machined directly into the aluminum housing. In the example of FIG. 9, there are four alignment tabs 120 and four corresponding housing pockets 122. This is merely illustrative. There may be one tab and one recess, two or more tabs and recesses, etc.

Light-emitting diode array 122 may be received within recess 124 in housing 26. Rectangular recess 134 in housing 26 may be sized to receive the rectangular outline of light guide structures 88. The depth of these recesses in housing 26 may be about 0.2 mm to 5 mm (as an example). The diagonal distance across the rectangular light guide structures 88 may be, for example, 5 to 20 inches.

With an arrangement of the type shown in FIG. 9, recesses 122 and tabs 120 may help align light guide in recess 134. For example, tabs may hold at least one of the edges of light guide structures 88 at a slight distance (clearance) from housing 26 to avoid creating pressure that might otherwise buckle light guide structures 88. Along edge 136 structures 88 may, if desired, protrude under a lip in housing 26 (i.e., a lip that forms a capturing groove). This optional lip (groove) may help retain light guide structures 88 in housing 26 (e.g., by receiving and retaining the edge of light guide structures 88). Along edge 138 of housing 26, clamp structure 130 may be used to help retain light guide structures 88 and light-emitting diode array 122 in housing 26. Clamp structure 130 may be secured to housing 26 using adhesive, fasteners such as screws 132, or other suitable attachment mechanisms. Screws 132 may pass through holes 128 in clamp 130 and may be received in threaded holes 126 in housing 26 (as an example). Clamp structure 130 may be formed in a single piece (as shown in FIG. 9) or one or more separate members may be used in forming clamp structure 130.

Clamp structure 130 may be formed from metal, plastic, composites, or other materials. For example, clamp structure 130 may be formed from a material such as stainless steel. Stainless steel can be formed in thin sheets that are relatively stiff, allowing the thickness of clamp structure 130 to be minimized. Housing 26 may be formed from aluminum or one or more other materials that are molded or machined into a desired shape (e.g., to form the alignment tab recesses of FIG. 9 and the rectangular recess that receives rectangular light guide structures 88).

Figure 10:
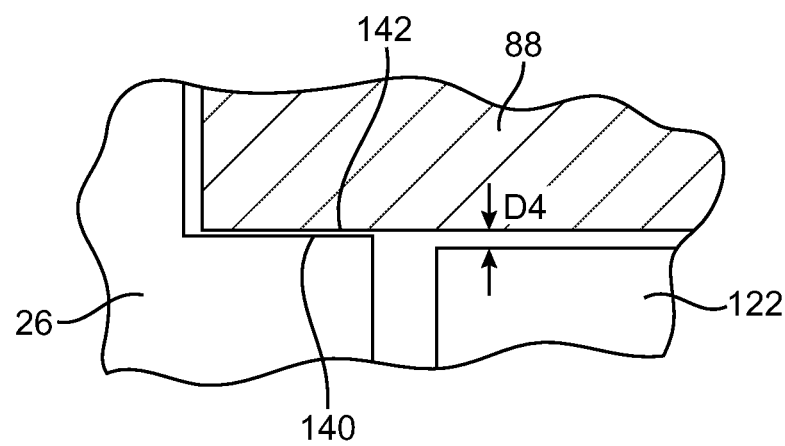
FIG. 10 is a top view of a computer housing in which a ledge has been formed to ensure that a light guide panel does not damage an associated array of light-emitting diodes in accordance with an embodiment of the present invention.

To help ensure that light guide structures 88 do not bear against light-emitting diode array 122 with excessive force, recess 134 may have lips such as lip 140. As shown in more detail in FIG. 10, lip 140 of housing 26 may help prevent edge 142 of light guide structures 88 from directly contacting light-emitting diode array 122. The nominal clearance D4 between edge 142 and light-emitting diodes 122 may be, for example, 0 mm to 1 mm.

Figure 11:
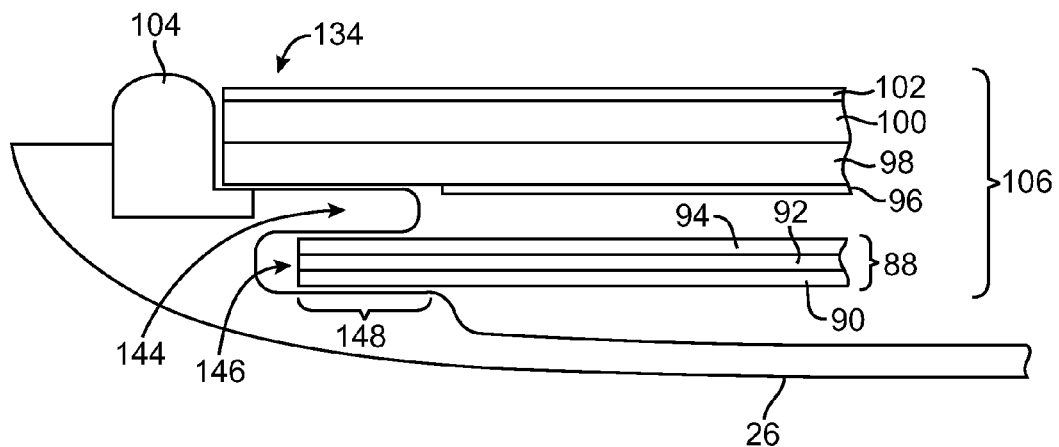
FIG. 11 is a cross-sectional side view of illustrative display structures in an electronic device such as a computer in which a device housing has been provided with an undercut groove portion to accommodate an edge of a light guide panel and other light guide components in accordance with an embodiment of the present invention.

As shown in FIG. 11, a portion of housing 26 (e.g., the portion along edge 134) may be provided with an undercut. In region 148, for example, lip 144 may extend outwards over undercut opening 146 to form a groove. Groove opening 146 may receive the edge of light guide structures 88, allowing the edge of housing 26 that surrounds display structure 106 to be narrowed.

Figure 12:
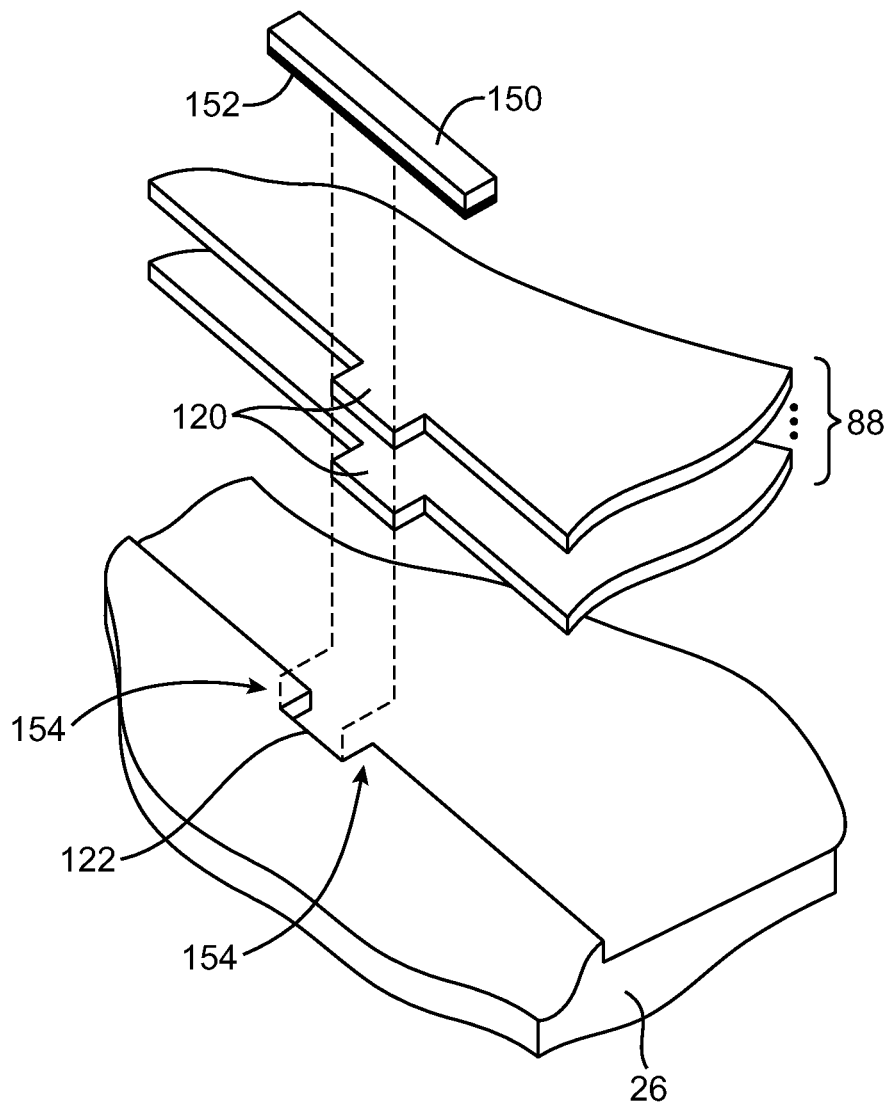
FIG. 12 is a perspective view showing how light guide components may have alignment features such as tabs that mate with corresponding housing alignment features such as tab-shaped recesses in accordance with an embodiment of the present invention.

A perspective view of one of recesses 122 (i.e., an alignment notch) and one of matching tabs 120 on light guide structures 88 is shown in FIG. 12. A strip of tape 150 with a layer of adhesive 152 may be placed over tabs 120. The tape may stick to housing 26 in regions 154 to hold tabs 120 in place in recess 122. Tape 150 may be removed to permit rework. If desired, recesses 122 may be provided with integral housing lips (i.e., recesses 122 may be implemented as covered notches rather than as exposed notches). This may help avoid the need for tape strips 150, but may require that light guide structures 88 be flexed slightly as part of the assembly process (i.e., to tuck tabs 120 into the covered notches and any grooves in the housing).

Figure 13:
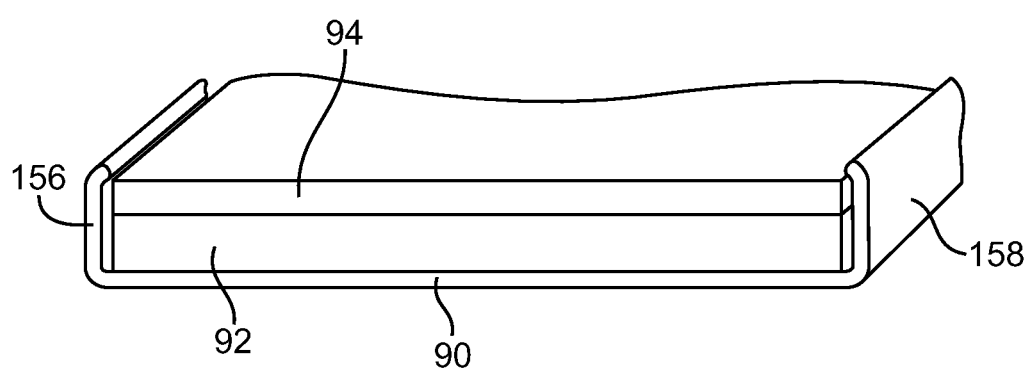
FIG. 13 is a perspective view showing how a reflective layer may be wrapped around the back and edges of a light guide panel to ensure that light is reflected back into the panel in accordance with an embodiment of the present invention.

Light-emitting diodes 122 (FIG. 9) emit light into the edge of light-guide panel 92. Light guide panel 92 directs the emitted light upwards through layers such as layers 98 and 100. To increase backlight efficiency, light leakage at the edges of light guide panel 92 should be minimized. With one suitable arrangement, the side walls of housing recess 134 that surround the edges of light guide panel 92 and the other light guide structures 88 may be machined to form a reflective surface or may be coated with white paint, chromium, or other reflective coatings. With another suitable arrangement, which is shown in FIG. 13, the edges of reflective sheet 90 (i.e., edges 156 and 158) may be wrapped upwards so as to surround the edges of light guide panel 92 and optical films 94. By reflecting light back into the edges of light guide panel 92, backlight that would otherwise be wasted is properly directed through the display.

In arrangements of the type shown in FIG. 13, reflective sheet 90 and wrapped reflective sheet edges 156 and 158 are formed from a unitary piece of material. If desired, separate layers of reflective material may be used for the main rear reflective sheet layer and for the reflective edges (as an example).

Figure 14:
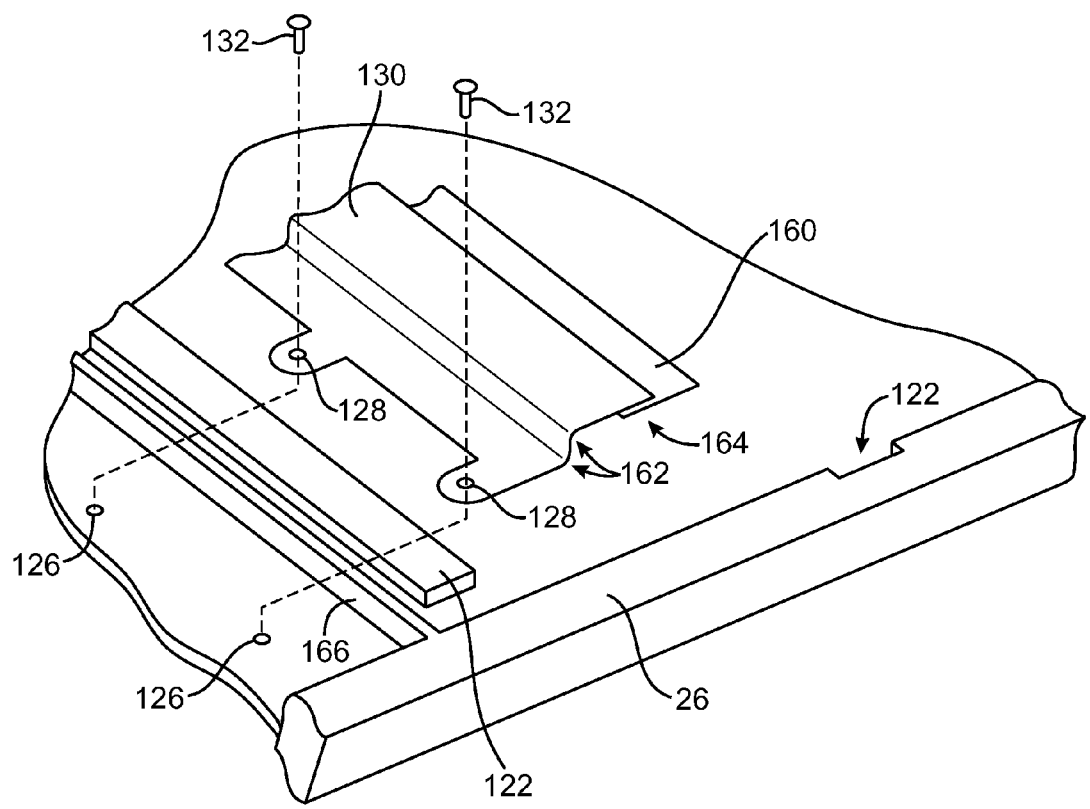
FIG. 14 is a perspective view of a portion of an electronic device housing showing how a clamp structure may be used to help retain an array of light emitting diodes while reflecting and guiding light that is produced by the light emitting diodes in accordance with an embodiment of the present invention.

A perspective view of an illustrative clamping arrangement in which reflective tape is used to help ensure satisfactory backlight performance is shown in FIG. 14. Clamp 130 has bends 162 that allow clamp 130 to pass over housing structures such as wall 166. Screws 132 may pass through holes 128 and into threaded holes 126 in housing 26 to hold clamp 130 in place over light-emitting diodes 122. A strip of reflective material such as reflective tape 160 may be attached along edge 164 of clamp 130. Tape 160 may help to reflect light from diodes 122 into the edge of light guide panel 92.

Figure 15:
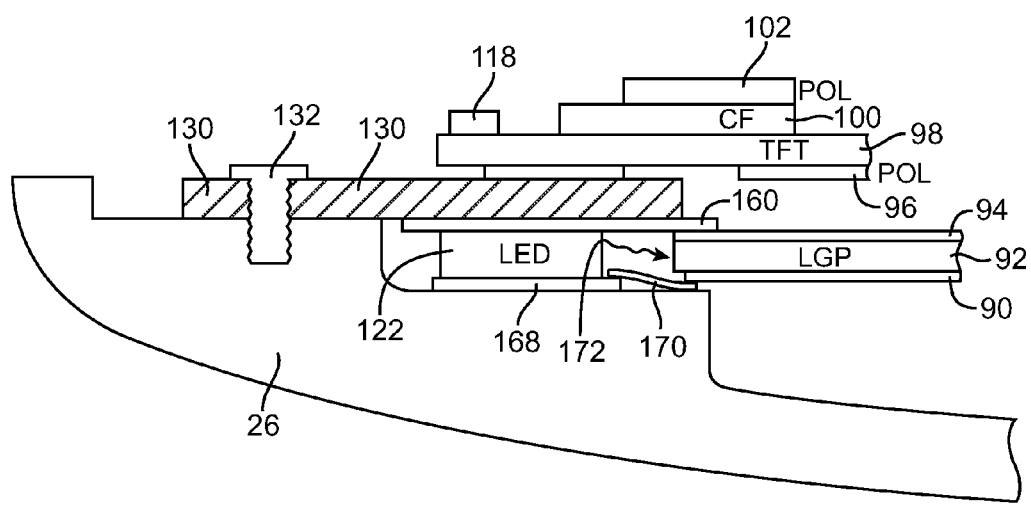
FIG. 15 is a cross-sectional side view of an illustrative electronic device showing how a planar clamp structure may be used to help retain an array of light emitting diodes in accordance with an embodiment of the present invention.

A cross-sectional side view of an illustrative mounting arrangement that uses a planar clamp is shown in FIG. 15. As shown in FIG. 15, driver circuitry 118 may be implemented using separate integrated circuits (as an example). Planar clamp structure 130 may be attached to housing 26 using screws such as screw 132. Reflective tape 160 may be placed above light-emitting diodes 122 to help guide light 172 into the edge of light guide panel 92. Reflective sheet 90 may be placed below the lower surface of light guide panel 92 to reflect escaping light back into light guide panel 92. Additional reflective structures such as reflective tape 170 may provide further light reflection. Light-emitting diodes 122 may be mounted on a substrate such as flex circuit 168. Tape 170 can be placed over the edge of flex circuit 168 as shown in FIG. 15.

Figure 16:
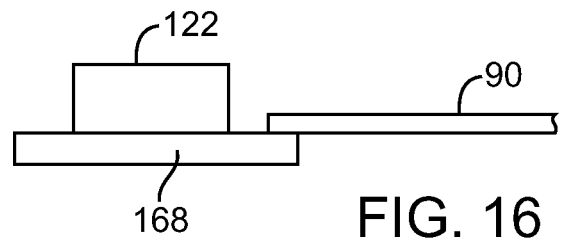
FIG. 16 is a cross-sectional side view of a light-emitting diode array showing how a reflective sheet may be placed over the edge of the light-emitting diode flex circuit in accordance with an embodiment of the present invention.

If desired, the edge of reflective sheet 90 may overlap the edge of flex circuit 168. This type of arrangement is shown in FIG. 16.

Figure 17:
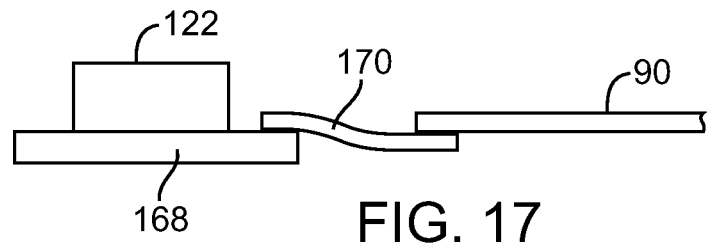
FIG. 17 is a cross-sectional side view of a light-emitting diode array showing how reflective tape may be placed over the edge of the light-emitting diode flex circuit and under the edge of a reflective sheet in accordance with an embodiment of the present invention.

FIG. 17 shows how tape 170 may have one edge that is placed over flex circuit 168 and one edge that is placed under reflective sheet 90 (as shown in the example of FIG. 15).

Figure 18:
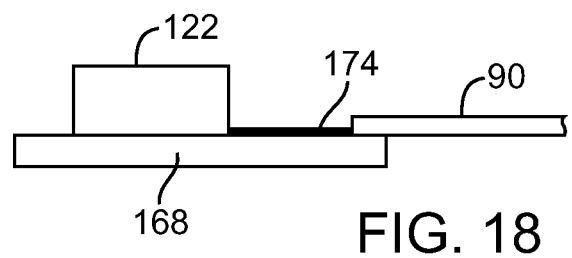
FIG. 18 is a cross-sectional side view of a light-emitting diode array showing how a reflective coating such as reflective paint may be used to reflect light in accordance with an embodiment of the present invention.

Light may also be reflected using reflective coatings. For example, tape 170 may be omitted and flex circuit 168 may be coated with reflective coating 174, as shown in FIG. 18. Coating 174 may be formed from reflective coating such as white paint or white ink, from a shiny substance such as a metallic paint or a metal coating, or other reflective materials.

Figure 19:
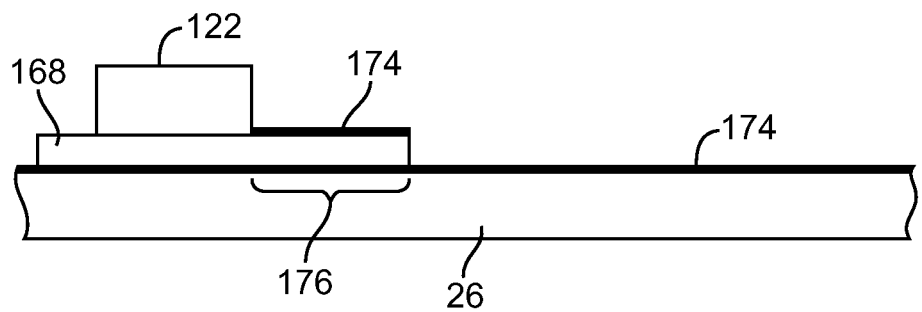
FIG. 19 is a cross-sectional side view of a light-emitting diode array showing how exposed interior surfaces of a computer housing may be coated with reflective coating such as reflective paint in accordance with an embodiment of the present invention.

In the illustrative configuration of FIG. 19, housing 26 has been provided with reflective coating 174. Some of reflective coating 174 has also been formed over exposed edge 176 of flex circuit 168. Reflective coating 174 may be formed by physical vapor deposition (e.g., sputtering), by silk screen printing, pad printing, spray coating, electrochemical deposition, electroplating, manual application with a paint brush or foam pad, ink jet printing, etc.

Figure 20:
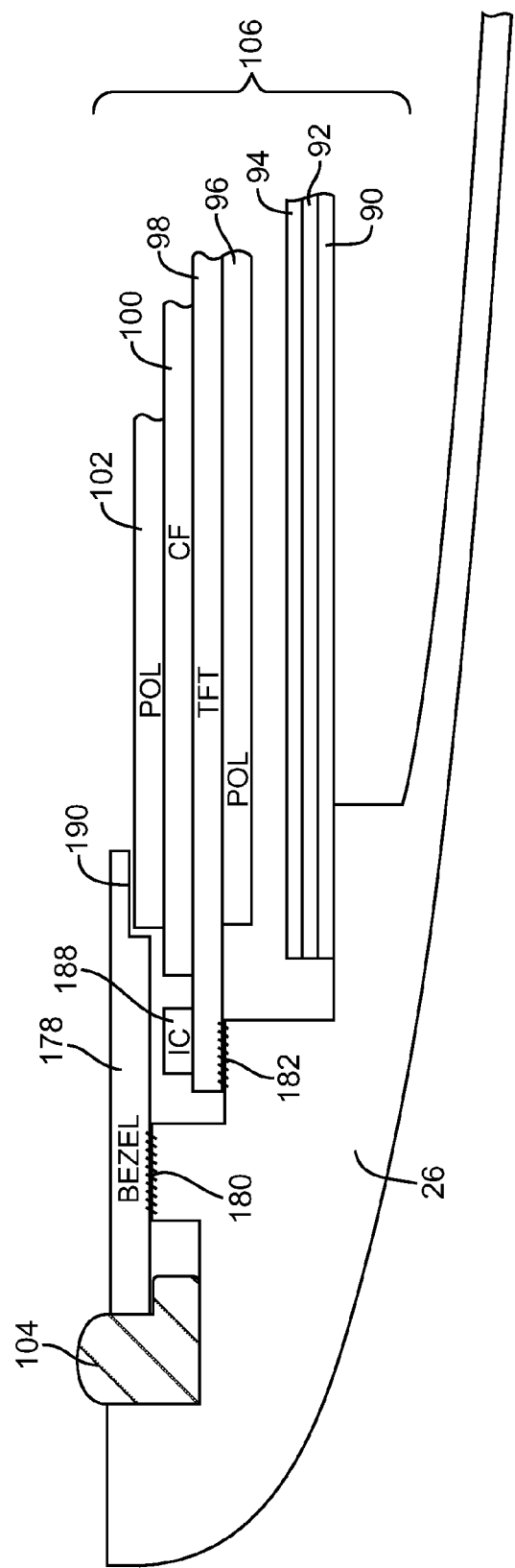
FIG. 20 is a cross-sectional side view of an illustrative electronic device such as a computer in which a bezel is used in covering display structures in accordance with an embodiment of the present invention.

If desired, a bezel may be used in covering display components. This type of arrangement is shown in FIG. 20. As shown in FIG. 20, bezel 178 may cover edge portions of display structures 106. Bezel 178 may be formed from plastic, glass, metal, composites, other suitable materials, or combinations of these materials. Driver circuitry 188 may be provided in the form of integrated circuits mounted on layer 98 or mounted on layer 100 or driver circuitry 188 may be provided in the form of circuitry integrated on layer 98 or on layer 100 (as examples). By using bezel 178, internal device structures such as circuitry 188 may be hidden from view from the exterior of device 10. Adhesive such as adhesive 180 may be used to attach bezel 178 to housing 26. Adhesive 182 may be used to attach display structures 106 to housing 26.

The foregoing is merely illustrative of the principles of this invention and various modifications can be made by those skilled in the art without departing from the scope and spirit of the invention.

What is claimed is:

1. Apparatus, comprising:
   a computer housing having a substantially rectangular recess with four edges;
   a substantially rectangular light guide panel disposed in the rectangular recess, wherein the light guide panel has four edges that are adjacent to the four edges of the rectangular recess without any intervening chassis structures;
   an array of light-emitting diodes that emit light into one of the edges of the light guide panel;
   a flex circuit on which the light-emitting diodes are mounted;
   reflective tape that covers at least part of the flex circuit;
   a metal clamp over that light-emitting diode array; and
   a strip of reflective material disposed between the light-emitting diode array and the metal clamp.

2. The apparatus defined in claim 1 further comprising a clamp structure disposed over an edge of the light guide panel.

3. The apparatus defined in claim 2 wherein the clamp structure comprises a sheet of metal.

4. The apparatus defined in claim 2 wherein the clamp structure comprises a strip of stainless steel that is screwed into the computer housing.

5. The apparatus defined in claim 1 wherein the light guide panel comprises at least one alignment tab and wherein the computer housing has at least one mating tab-shaped recess into which the alignment tab protrudes.

6. The apparatus defined in claim 5 further comprising a reflective coating in the rectangular recess that reflects light back into the light guide panel.

7. The apparatus defined in claim 6 wherein the reflective coating comprises white paint in the rectangular recess.

8. The apparatus defined in claim 6 wherein the reflective coating comprises a layer of metal.

9. The apparatus defined in claim 1 further comprising a white reflective sheet disposed between the light guide panel and the recess in the computer housing, wherein the white reflective sheet has portions that cover at least one of the edges of the light guide panel.

10. The apparatus defined in claim 1 wherein the computer housing comprises machined aluminum.

11. The apparatus defined in claim 1 further comprising:
    a thin-film transistor glass layer; and
    a color filter glass layer, wherein the thin-film transistor glass layer and the color filter glass layer are positioned above the rectangular recess and wherein light from the light guide panel passes through the thin-film glass layer and the color filter glass layer.

12. The apparatus defined in claim 1 wherein the light guide panel comprises at least one alignment tab, wherein the computer housing has at least one mating tab-shaped recess into which the alignment tab protrudes, wherein the apparatus further comprises layers of optical films including a diffuser layer, and wherein the layers of optical films each include at least one alignment tab that protrudes into the tab-shaped recess in the computer housing.

13. The apparatus defined in claim 12 further comprising a plastic reflective sheet under the light guide panel, wherein the plastic reflective sheet has bent edges that cover at least two of the edges of the light guide panel.

14. The apparatus defined in claim 1 further comprising:
    glass layers through which light from the light guide panel passes; and
    a bezel that covers at least part of the glass layers.

15. The apparatus defined in claim 1 further comprising a sheet of reflective material under the light guide panel, wherein at least a portion of the sheet of reflective material covers the flex circuit.

16. A computer, comprising:
    a housing having a base unit hingedly connected to a display housing wherein the display housing comprises a machined rectangular recess having four recess edges and having alignment notches disposed along at least two of the four recess edges; and a rectangular light guide panel having at least four light guide panel edges and having alignment tabs disposed along at least two of the four light guide panel edges, wherein the alignment taps protrude into and mate with the alignment notches in the display housing;

a color filter glass layer through which light from the rectangular light guide panel passes;

a white reflective sheet with tabs that mate with the alignment notches;

at least one optical film layer on the light guide panel, wherein the at least one optical film layer includes a diffuser layer with tabs that mate with the alignment notches;

light-emitting diodes that emit light into a given one of the edges of the light guide panel; and a metal clamp structure that is screwed into the housing along one of the four recess edges and that covers the light-emitting diodes and the given one of the edges of the light guide panel.

* * * * *